(12) United States Patent
Shaklee et al.

(10) Patent No.: US 6,545,636 B1
(45) Date of Patent: Apr. 8, 2003

(54) PHOTOGRAPHIC PROCESS PRINTER USING A LINEAR DIGITAL EXPOSURE ENGINE FOR PRINTING UPON CUT-SHEET PAPER

(75) Inventors: Kerry L. Shaklee, Brighton, CO (US); Gary L. Brackett, Canon City, CO (US)

(73) Assignee: Sienna Imaging, Inc., Englewood, CO (US)

( * ) Notice: Subject to any disclaimer, the term of this patent is extended or adjusted under 35 U.S.C. 154(b) by 0 days.

(21) Appl. No.: 09/658,904

(22) Filed: Sep. 11, 2000

(51) Int. Cl.[7] .................................. B41J 2/435
(52) U.S. Cl. ...................... 342/262; 347/264
(58) Field of Search ................. 347/102, 101, 347/154, 157, 215, 220, 221, 262, 264, 248, 236; 355/32; 378/173; 382/169; 250/208.1

(56) References Cited

U.S. PATENT DOCUMENTS

| | | | | |
|---|---|---|---|---|
| 4,924,486 A | * | 5/1990 | Weber et al. ............... 378/173 |
| 5,331,338 A | * | 7/1994 | Mager ......................... 347/248 |
| 5,699,143 A | * | 12/1997 | Wess et al. .................... 355/32 |
| 6,048,059 A | * | 4/2000 | Wafler ......................... 347/102 |
| 6,101,273 A | * | 8/2000 | Matama ....................... 382/169 |
| 6,316,761 B1 | * | 11/2001 | Yamaguchi ............... 250/208.1 |
| 6,388,694 B1 | * | 5/2002 | Fujita .......................... 347/236 |

\* cited by examiner

*Primary Examiner*—Hai Pham
(74) *Attorney, Agent, or Firm*—James R. Young (57) ABSTRACT

A printer feeds cut-sheet print media past an exposure area of a linear exposure print engine exposing the edges of the media. A sheet of print media is fed into a pair of open leading edge pinch rollers as printing is started. These rollers close and push the media past the exposure area where the leading edge of the sheet is exposed to the image being printed. The leading edge then passes through a pair of open trailing edge pinch rollers, which close to start pulling the media through the exposure area. After the trailing edge pinch rollers close, the leading edge pinch rollers open, transferring the movement from the leading edge pinch rollers to the trailing edge pinch rollers, allowing the trailing edge pinch rollers to pull the trailing edge of the sheet through the exposure area where it is exposed to the image being printed.

19 Claims, 11 Drawing Sheets

PHOTOGRAPHIC PROCESS PRINTER USING A LINEAR DIGITAL EXPOSURE ENGINE FOR PRINTING UPON CUT-SHEET PAPER

FIELD OF THE INVENTION

This invention relates to printers for computer systems and more particularly to Cathode Ray Tube (CRT) exposure systems within such printers. Even more particularly, the invention relates to using a linear digital exposure engine to expose photosensitive cut-sheet media.

BACKGROUND OF THE INVENTION

Digital photographic process printers that utilize cathode ray tubes (CRT's) for media exposure typically expose the photographic media line by line directly from the face of the CRT or through fiber optics or through a Graded Index Lens. That is, the light from each element, or pixel, on the face of the CRT is conducted to the media directly, through a conventional lens, through a fiber optic face plate or through the graded index lens. The interior surface of the face plate typically has three phosphor stripes or bands; one for red, one for green, and one for blue, for the three color components that make up the elements. The controller for the CRT uses linear deflection amplifiers to select a phosphor and sweep an electron beam across one phosphor on the face of the CRT to expose one line on the media to one color at a time. This exposes the media in a deflection cycle that typically consists of a sweep, retrace, and hold period. During the sweep period, the CRT electron beam is unblanked and the beam is driven horizontally at a given vertical position while being intensity modulated to expose the media to the correct amount light at each location on the line of the media. The particular color being exposed is determined by the vertical position of the electron beam on the face of the CRT. To correctly expose each line of the media to each color, the media is moved as each color is selected and exposed.

Figure 1:
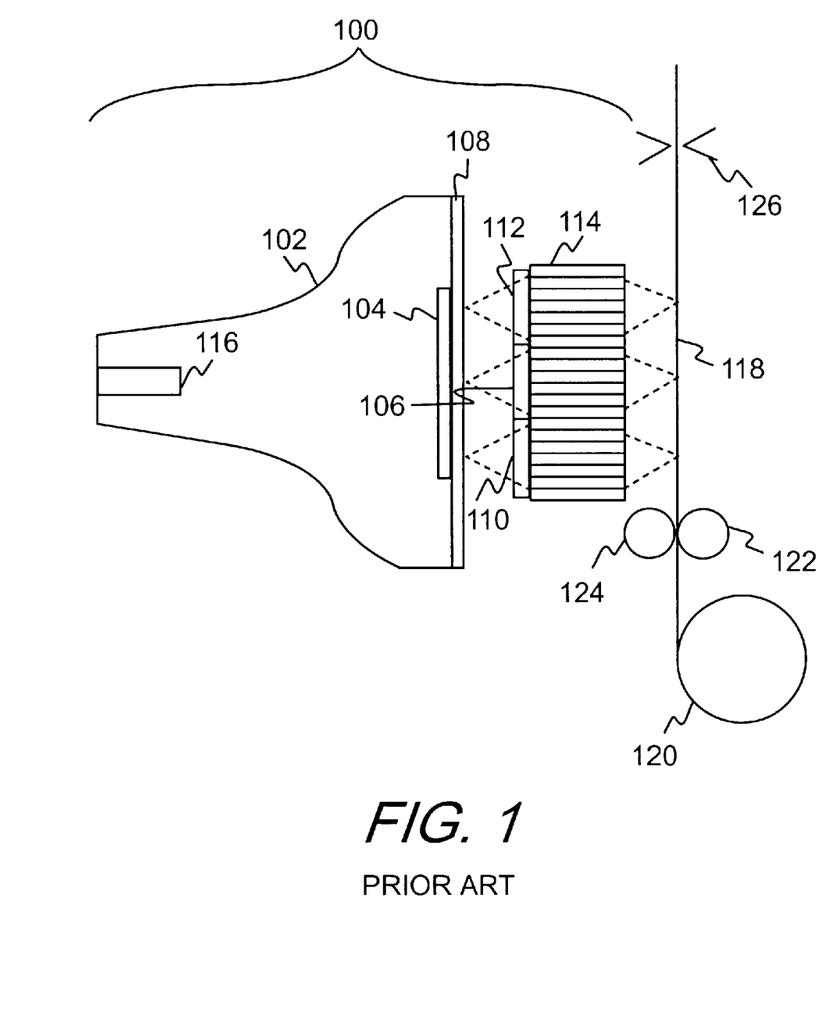
FIG. 1 shows a block diagram of prior art system for printing on roll paper using a digital print engine and then cutting the roll paper after exposure.

In prior art systems that use rolls of paper, as shown in FIG. 1, moving the media comprised unrolling the paper from a supply roll 120 and pushing the paper with rollers 122 and 124 to expose each line of the print media to the CRT at each position and then cutting the paper into sheets by a cutting device 126 after the paper is exposed by CRT 100 and graded index lens 114. Because the roll is continuous, the entire print sheet is easily exposed since it is not cut by cutting device 126 until after the exposure. However, precise paper positioning is required to avoid cutting the page incorrectly such that a cut sheet contains a segment of unexposed media or that a segment of exposed media is left for the next sheet. Thus, a disadvantage of this approach is that the junction between adjacent prints must be accurately sensed and the cut precisely positioned in order to avoid these problems. Alternatively, a slug may be removed between images by using a double cut, but this causes paper waste and requires a mechanism for disposing of the slugs.

Figure 2:
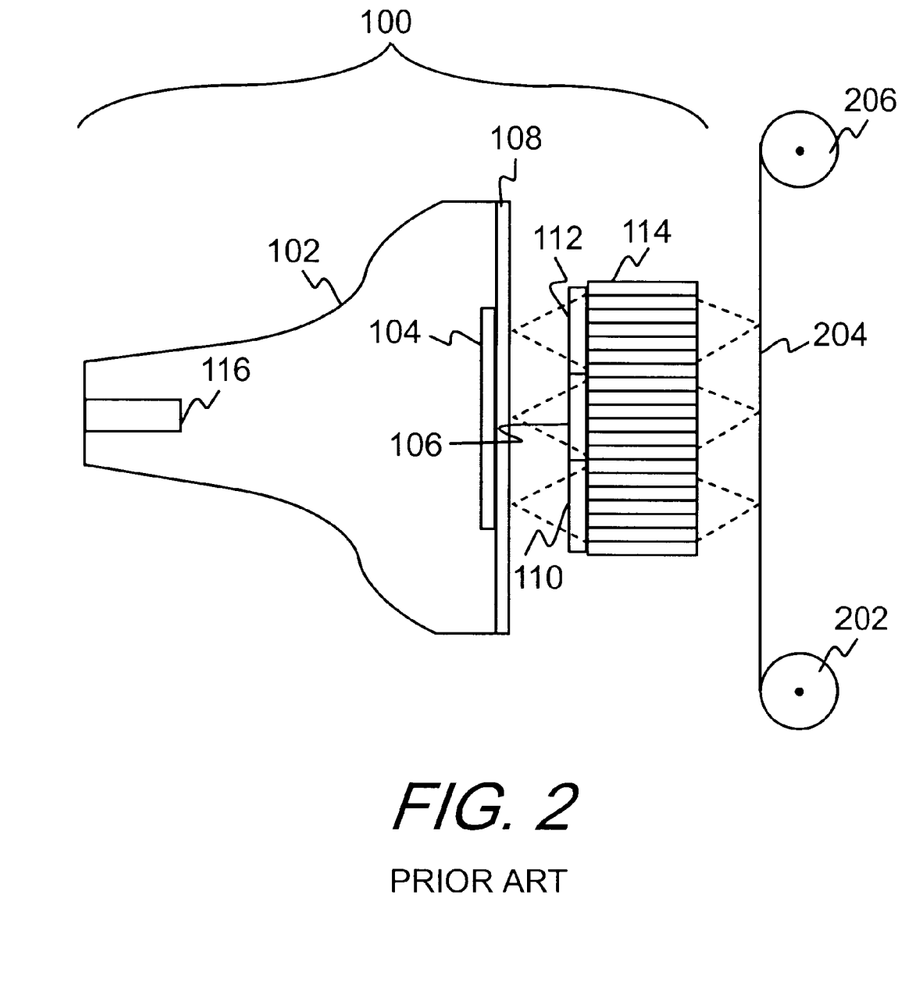
FIG. 2 shows a block diagram of prior art system for printing on roll paper using a digital print engine and re-rolling the paper after exposure.

In prior art systems that use a take-up roller, as shown in FIG. 2, moving the media comprises unrolling the media from a supply roll 202 and pulling the paper past the print engine 100 with a take-up roller 206. Again the roll of media is continuous to each print is easily exposed since it is not cut until a later time after exposure and development.

If the print media is pre-cut before being inserted into the printing mechanism, however, a problem arises with exposing the leading and trailing edges of the paper. Since these edges are typically gripped by some mechanism to hold the paper, this gripping mechanism covers the edges, thus preventing exposure of the edges.

There is a need in the art for an apparatus and method for exposing an entire sheet of cut-sheet print media. There is another need in the art for such a system that can print while moving the print media in either direction through the print engine. The present invention meets these and other needs in the art.

SUMMARY OF THE INVENTION

It is an aspect of the present invention to print images on cut-sheet print media using a digital print engine.

It is another aspect of the invention to expose both the leading and trailing edges of the print media to accomplish "full bleed" printing of the entire sheet of print media.

Another aspect of the invention is to expose the print media as it is moved either forward or backward through the print engine.

A further aspect of the invention is to start print media movement using a first set of pinch rollers, then transfer the movement to a second set of pinch rollers.

The above and other aspects of the invention are accomplished in a printer that feeds cut-sheet print media past an exposure area of a print engine to allow the media to be completely exposed up to the edge of each sheet of the print media.

A sheet of print media is fed into a pair of open leading edge pinch rollers as printing is started. The leading edge pinch rollers then close and push the print media past the exposure area where the leading edge of the sheet is exposed to the image being printed as the media moves past the exposure area. As the leading edge of the sheet exits the exposure area, it passes through a pair of open trailing edge pinch rollers, which close to start pulling the media through the exposure area. After the trailing edge pinch rollers close, the leading edge pinch rollers open, transferring the movement from the leading edge pinch rollers to the trailing edge pinch rollers, allowing the trailing edge pinch rollers to pull the trailing edge of the sheet through the exposure area where it is exposed to the image being printed. This allows both the leading and trailing edges of the sheet of print media to be exposed, thus accomplishing "full bleed" printing of the edges of the sheet of print media.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

FIG. 1 shows a prior art system for printing on roll print media. Referring to FIG. 1, a print engine 100 contains a CRT 102 with an electron gun 116 used to activate white phosphor 104 on a face 108 of the CRT 102. A red filter 112 is shown located on an outside surface of a graded index lens array 114 and opposite the face 108 the CRT 102 to filter out all but red light reaching the graded index lens array 114. Similarly green filter 106 and blue filter 110 are also located on the graded index lens array 114 and opposite the face 108 of the CRT 102. Locating the filters 112, 106 and 110 on outside the CRT 102 allows the use of white phosphor at all locations within the CRT 102, thus reducing cost.

A supply roll 120 supplies print media 118 for the print engine 100 by unrolling print media 118 and passing the print media 118 between rollers 122 and 124 where it is exposed by print engine 100. After being exposed by print engine 100, the print media 118 is cut into sheets by a cutting device 126. Because the print media 118 is not cut until after exposure by the print engine 100, the leading and trailing edges of the media, which are cut by cutting device 126, can be exposed before cutting and thus can be entirely exposed to accomplish "full bleed" printing of these edges. However, precise paper positioning is required to avoid cutting the page incorrectly causing a cut sheet to contain a segment of unexposed media or leaving a segment of exposed media for the next sheet. Thus, a disadvantage of this approach is that the junction between adjacent prints must be accurately sensed and the cut precisely positioned.

FIG. 2 shows a prior art system, similar to the system of FIG. 1, except that in FIG. 2, the print media is not cut by the device. Referring to FIG. 2, print engine 100 exposes print media 204 which is unrolled from supply reel 202 and then rolled onto take-up reel 206 after exposure. The print images are cut into separate sheets using a follow-on process (not shown). As in the device of FIG. 1, the print media 204 is not cut until after exposure by the print engine 100, thus the top and bottom edges can be entirely exposed as the media is rolled past the print engine 100. This also has the problem of requiring a precise cut to avoid segments of unexposed media or leaving an exposed segment for the next sheet. Often, in prior art systems, the boundary between images is market by punching a hole in the media.

Figure 3:
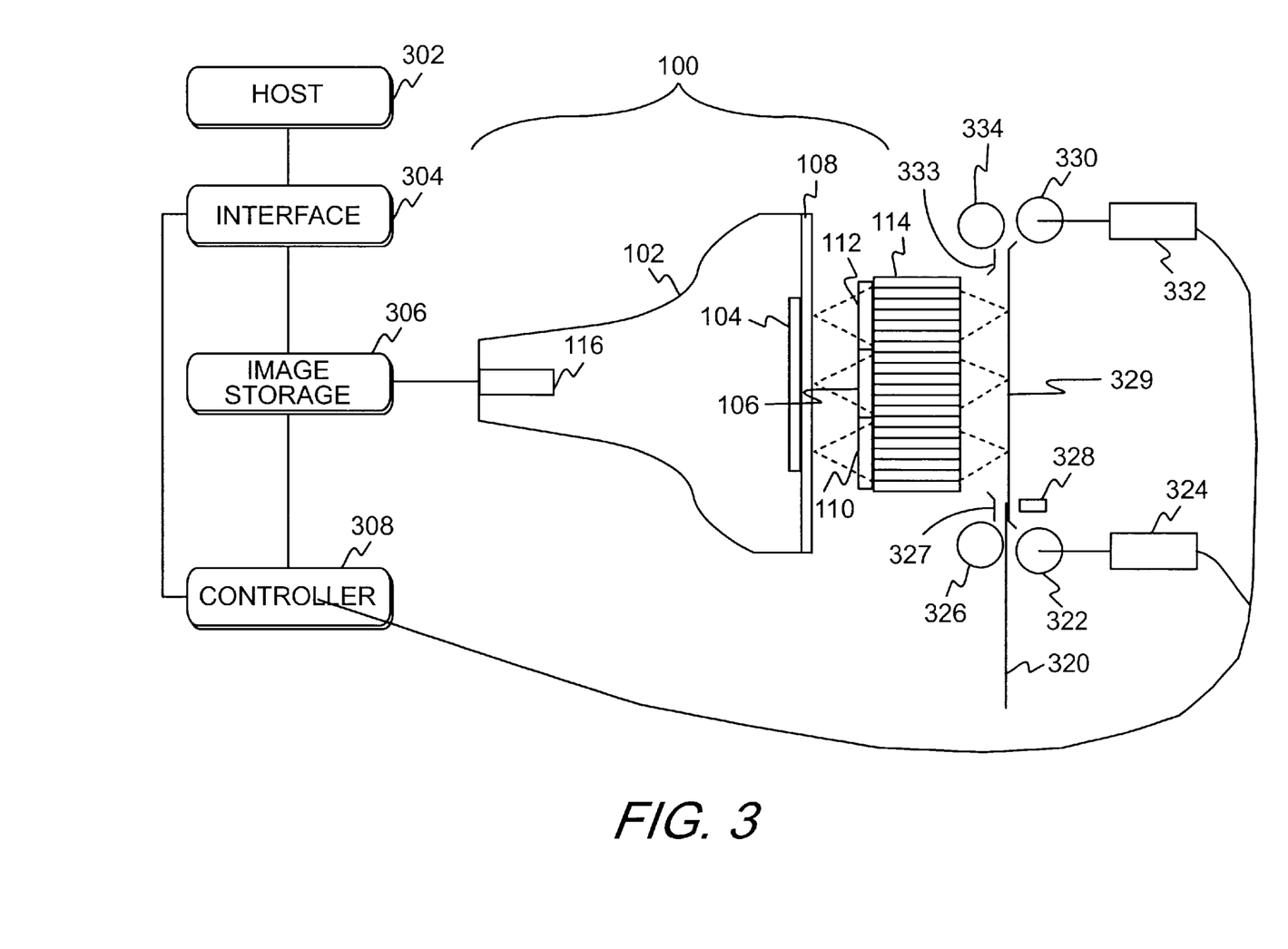
FIGS. 3–7 show the present invention and the process of moving cut-sheet print media to expose it by the print engine.

FIGS. 3–7 show the device of the present invention that moves pre-cut sheets of print media through a print engine while allowing exposure of the leading and trailing edges of the sheet of print media. Referring to FIG. 3, a host computer system 302 sends print image data to an interface 304 which stores the image data into an image storage 306. The interface 304 and the image storage 306 are controlled by a controller 308. A print engine 100 is connected to receive image data from the image storage 306 and expose cut-sheet photographic print media 320. Because the print engine 100 exposes the print media one line at a time, it is also called a linear exposure device. In the preferred embodiment, print engine 100 uses a graded index lens array 114 to focus light from the CRT 102 onto the photographic print medium 320, however, those skilled in the art will recognize that other types of linear exposure print engines, for example PLZT, DMD (Micro Mirrors), laser, LED, LCD and Vacuum Flourescent, could also be used.

Photographic print media 320 is inserted into the print area by an external feed mechanism (not shown). The print media could be inserted from a stack of media, or fed from a roll of media and cut before being inserted into the print area. Inserting the media places it between leading pinch rollers 322 and 326 and between paper guide 327 and an edge of backing plate 329. A leading pinch roller activation device 324, typically a solenoid or motor drive, is used to drive pinch roller 322 against pinch drive roller 326 to close the pinch rollers in order to move the print media. Typically, the pinch rollers are closed when media detector 328 detects that a sheet of print media 320 has been inserted between the pinch rollers, as described below with respect to FIG. 9.

Figure 4:
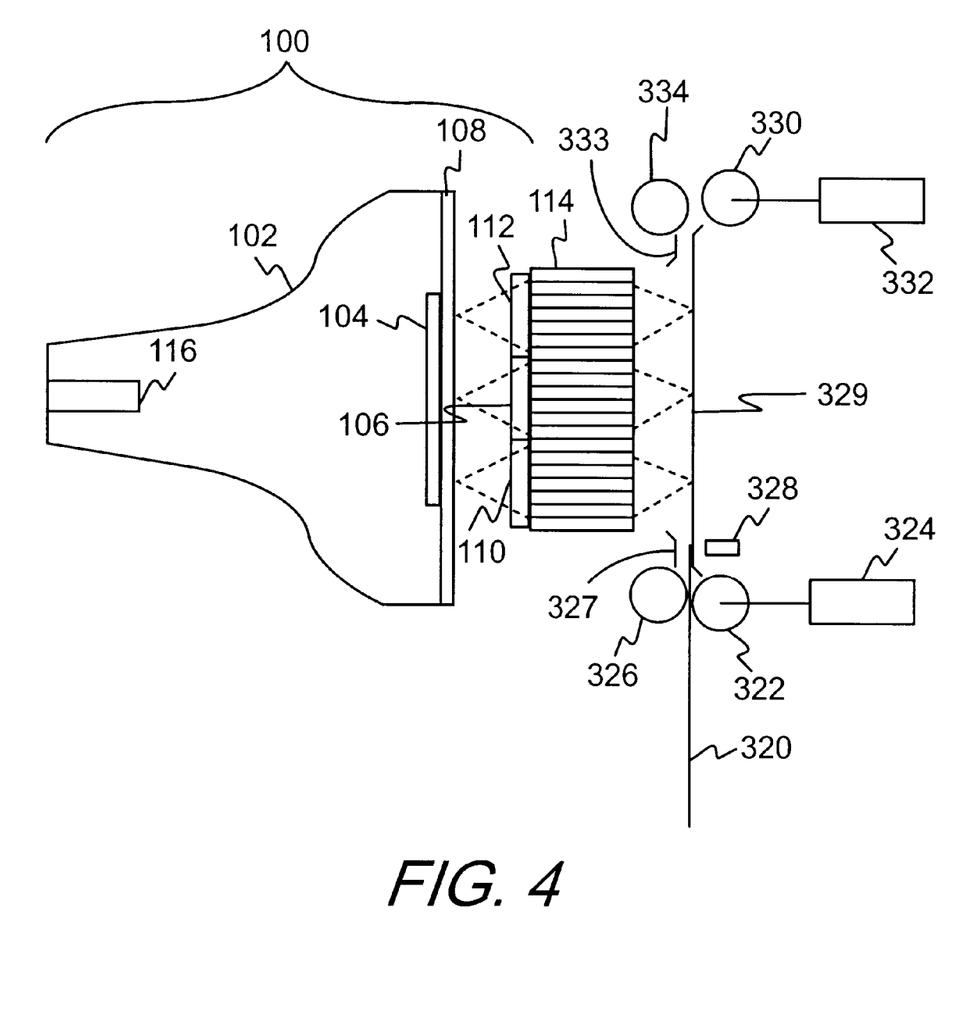

FIG. 4 shows leading pinch rollers 322 and 326 closed and print media 320 starting movement into print engine 100. As a leading (front) edge of print media 320 is moved into an exposure area in front of graded index lens array 114 it is exposed to the image being printed. Since this leading edge is pushed into the print area after the exposure process has been initiated, the leading edge is entirely uncovered and therefore the leading edge is exposed by the print engine 100.

Figure 5:
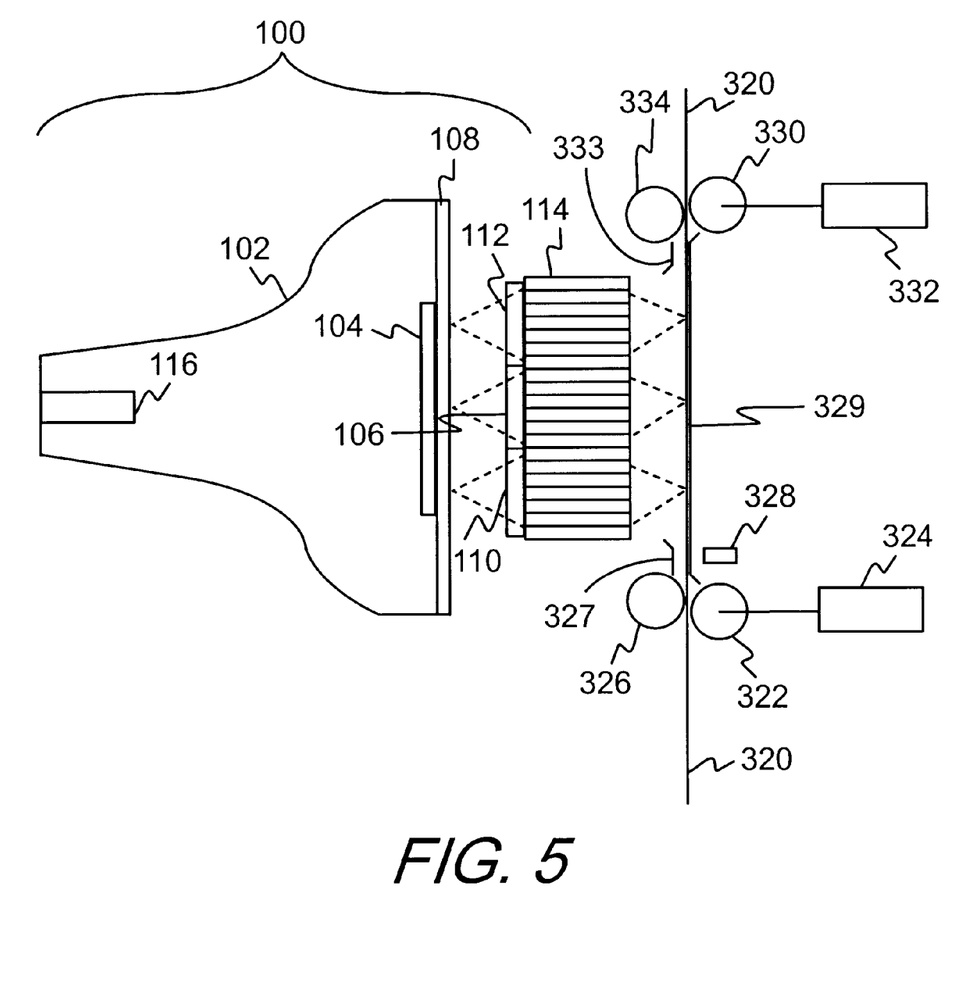

FIG. 5 shows print media as it moves past the graded index lens array 114, past media guide 333 and through trailing pinch rollers 330 and 334. Pinch roller 330 has been moved against pinch roller 334 by a trailing pinch roller activation device 332, typically a solenoid or motor drive, to grip the print media 320. A more complete description of this process can be found in the description of FIG. 9 below.

Figure 6:
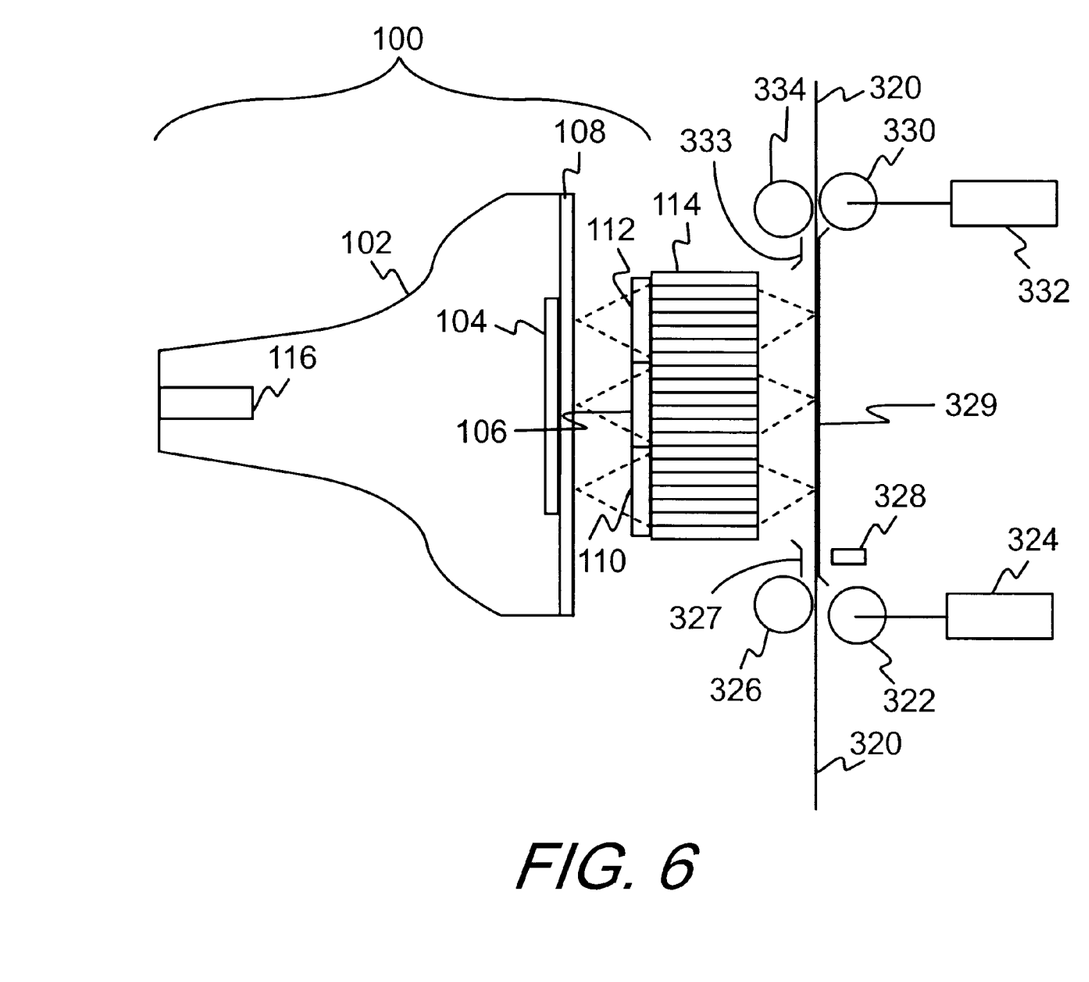

FIG. 6 shows pinch rollers 322 and 324 open such that the print media 320 is being driven only by pinch rollers 330 and 334. Pinch rollers 330 and 334 continue to drive the print media 320 until the trailing edge of the print media passes out of the exposure area in front of the graded index lens array 114. As the print media 320 is moved, the trailing edge of the print media is exposed to the print image, thus completing the "full bleed" printing of the cut-sheet print media 320.

Figure 7:
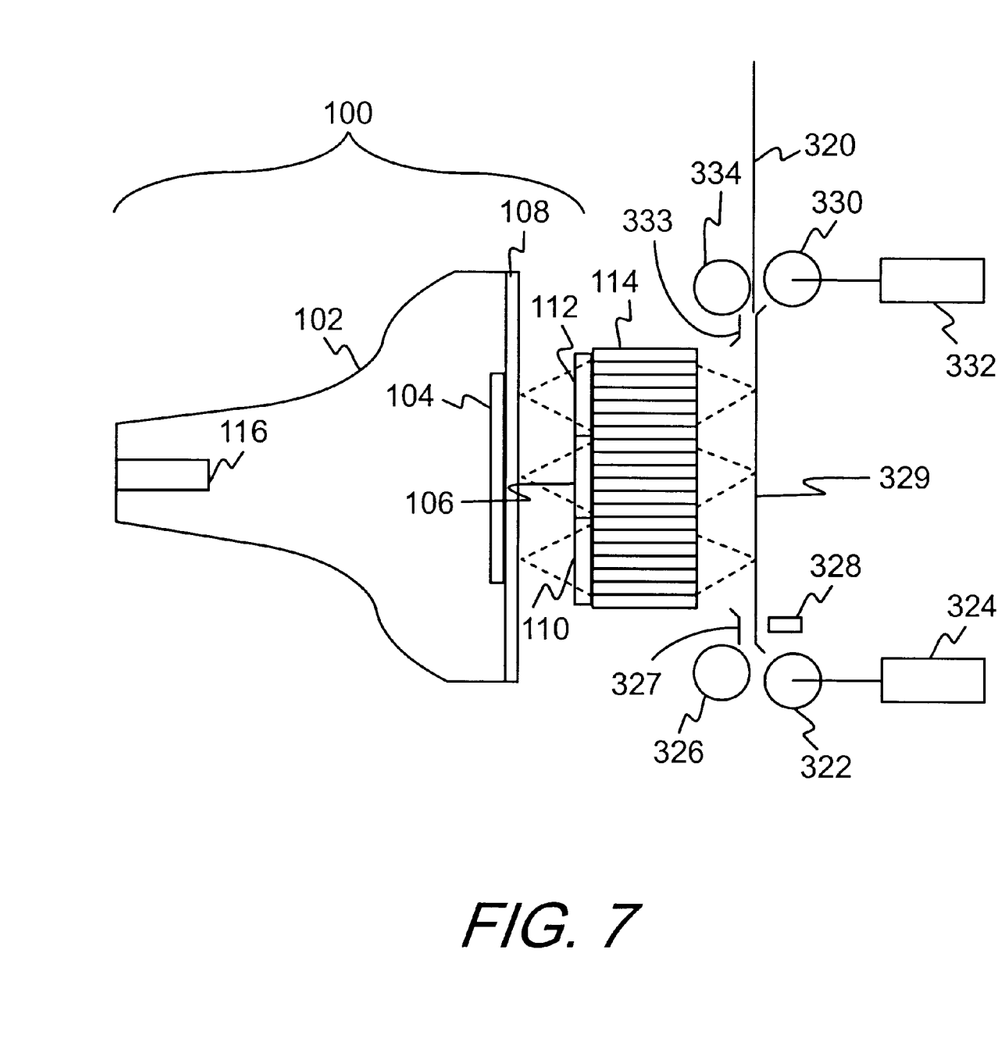
Figure 8:
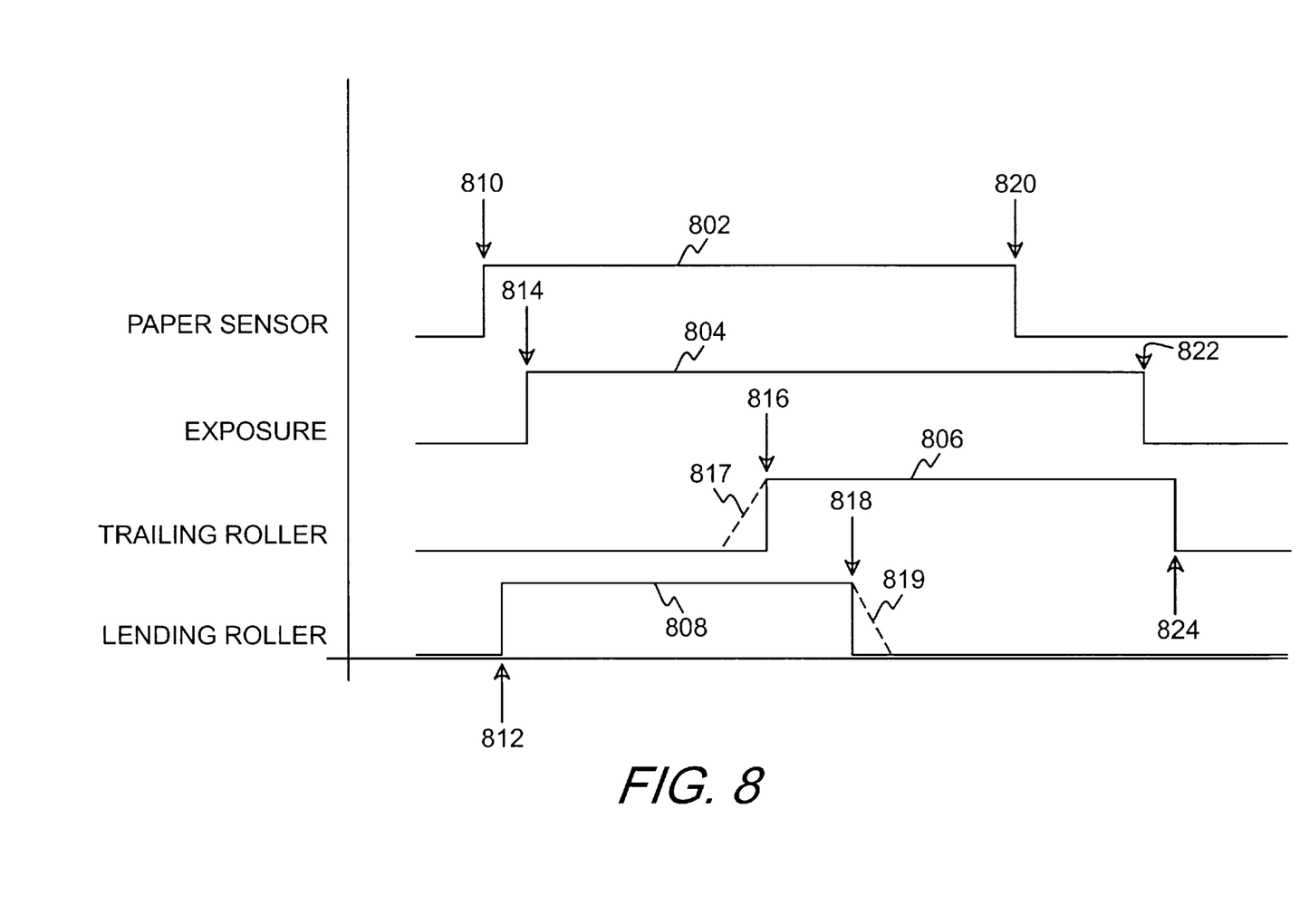
FIG. 8 shows a timing diagram of the present invention.

FIG. 7 shows the print media being extracted from the exposure area in front of graded index lens array 114. FIG. 8 shows a timing diagram of the process of moving a sheet of cut-sheet print media through the exposure engine. Referring to FIG. 8, timing line 802 shows the timing of paper sensor 328; timing line 804 shows the timing of exposure of the print media by print engine 100; timing line 806 shows the open and close times of the trailing pinch rollers 330 and 334; and timing line 808 shows the open and close times of the leading pinch rollers 322 and 326.

As a sheet of cut-sheet print media 320 moves into the device (see FIG. 3), paper sensor 328 senses the media at time 810, as indicated by the rise of timing line 802 at time 810. This causes pinch roller activation device 324 to close pinch roller 322 at time 812, to start driving the leading edge of media 320 up to the beginning of the exposure area. Just before the media 320 is driven into the exposure area, exposure of the media starts at time 814.

At time 816 trailing pinch roller 330 is closed after the print media 320 moves between pinch rollers 330 and 334. Line 817 shows that pinch roller 330 is closed gradually, as described below, to prevent media artifacts from occurring during the closing. Between times 81G and 818 the media is being driven by both sets of pinch rollers.

At time 818 the leading pinch rollers start opening. Line 819 indicates that these pinch rollers are opened gradually, as described below, to prevent artifacts from occurring during the opening. At time 820, the print media 320 trailing edge moves past media sensor 328, indicating that a known length of media remains to be exposed, and exposure of the trailing edge of media 320 continues. At time 822, exposure is stopped after all of the sheet of media 320 has been exposed and the trailing edge passes out of the exposure region. The sheet of media 320 then moves out of the print engine and trailing pinch rollers 330 and 334 are opened at time 824. Beyond this time, the media 320 is moved by a media stacking device, not shown.

Figure 9:
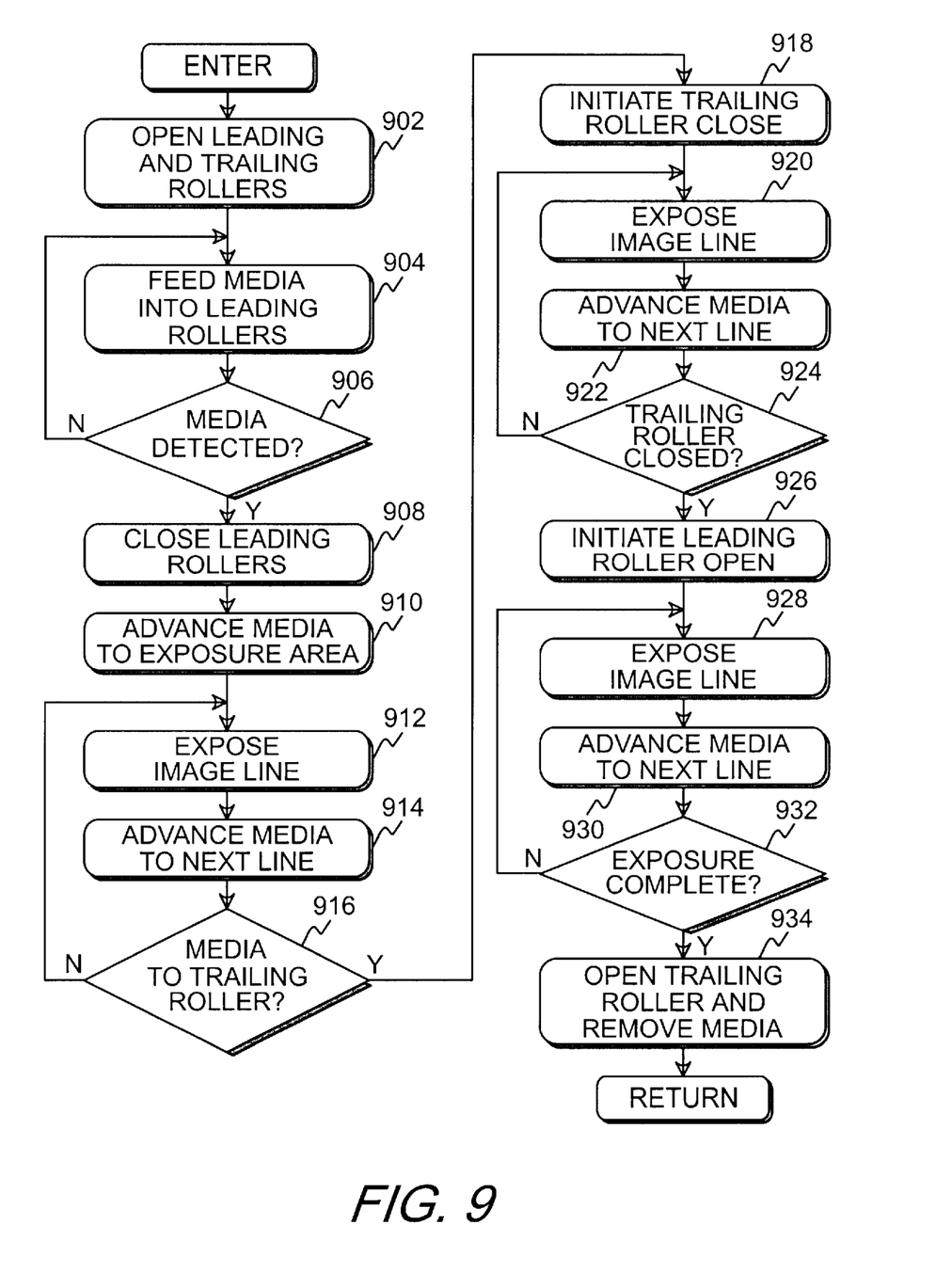
FIG. 9 shows a flowchart of printing a sheet of cut-sheet media.

FIG. 9 shows a flowchart of the present invention process of printing one sheet of the cut-sheet media. The process of FIG. 9 is called from other software within the printer whenever a sheet of media is to be printed. Referring to FIG. 9, after entry, step 902 opens both the leading rollers 322 and 326 and the trailing rollers 330 and 334. In step 904 the feed mechanism (not shown) then feeds a sheet of media between the leading rollers 322 and 326, as shown above with respect to FIG. 3. Step 906 uses the detector 328 to detect if the leading edge of the media is completely between the rollers, and if not, control returns to step 904 to continue feeding the media.

Once the media is between the rollers, control goes to step 908 which closes the leading rollers 322 and 326. The speed at which these rollers are closed does not affect the printing of the media, since the media has not yet reached the exposure area. Once the leading rollers are closed, step 910 continues to advance the media until it reaches the exposure area, which is a known distance from detector 328, then step 912 prints one line of the image. Since the leading edge of the media is uncovered, the line of the image can be printed as close to the leading edge as desired, thus allowing "full bleed" print of the leading edge of the media.

After printing a line of image, step 914 advances the media to the next line, and step 916 determines if the media has reached the trailing pinch rollers 330 and 334. This can be determined by measuring the advance of the pinch rollers 330 and 334 since the leading edge of the media was detected by detector 328 and there is a known distance from detector 328 to the trailing pinch rollers 330 and 334, or by a second media detector (not shown). If the media has not reached the trailing pinch rollers 330 and 334, control returns to step 912 to print the next line of the image. Once the leading edge of the media reaches the trailing pinch rollers 330 and 334, control goes to step 918 which initiates closing of the trailing pinch rollers 330 and 334.

To avoid placing artifacts on the printed image, trailing rollers 330 and 334 must be closed in a manner that does not cause the paper to alter its motion. Leading pinch rollers 322 and 326 and trailing pinch rollers 330 and 334 are both driven at the same speed. Image lines are printed at a rate of approximately 1 millisecond each, which requires the media to move at approximately 2 inches per second. By closing the trailing pinch rollers at a speed that causes them to engage the print media over 100 milliseconds, through 0.2 inches of media movement, media motion is unimpaired, and artifacts are prevented. Those skilled in the art will recognize that the pinch roller opening and closing time can vary substantially without causing artifacts on the exposed media.

After initiating closing of the trailing pinch rollers, step 920 prints a line of the image on the media, and step 922 advances the media to the next image print line. Step 924 determines if the trailing rollers have completed closing, and if not, returns to step 920 to print the next image line.

After the trailing rollers 330 and 334 are completely closed, step 924 goes to step 926 which initiates opening of leading rollers 322 and 326. To avoid placing artifacts on the printed image, leading rollers 322 and 326 must be opened in a manner that does not cause the paper to alter its motion. This can be the same speed that trailing rollers 330 and 334 were closed, although they may be opened at a different speed.

After initiating opening of the leading rollers 322 and 326, step 926 goes to step 928 which prints the next image line. Step 930 advances the media to the next image line, and step 932 determines whether the exposing of the image is complete. If not, control returns to step 928 to expose the next image line. During this process the trailing edge of the media is not covered, thus it can be expose to complete the "full bleed" exposure of the sheet of media. Once the image is completely exposed, control goes to step 934 which opens the trailing rollers 330 and 334 and then removes the media.

Figure 10:
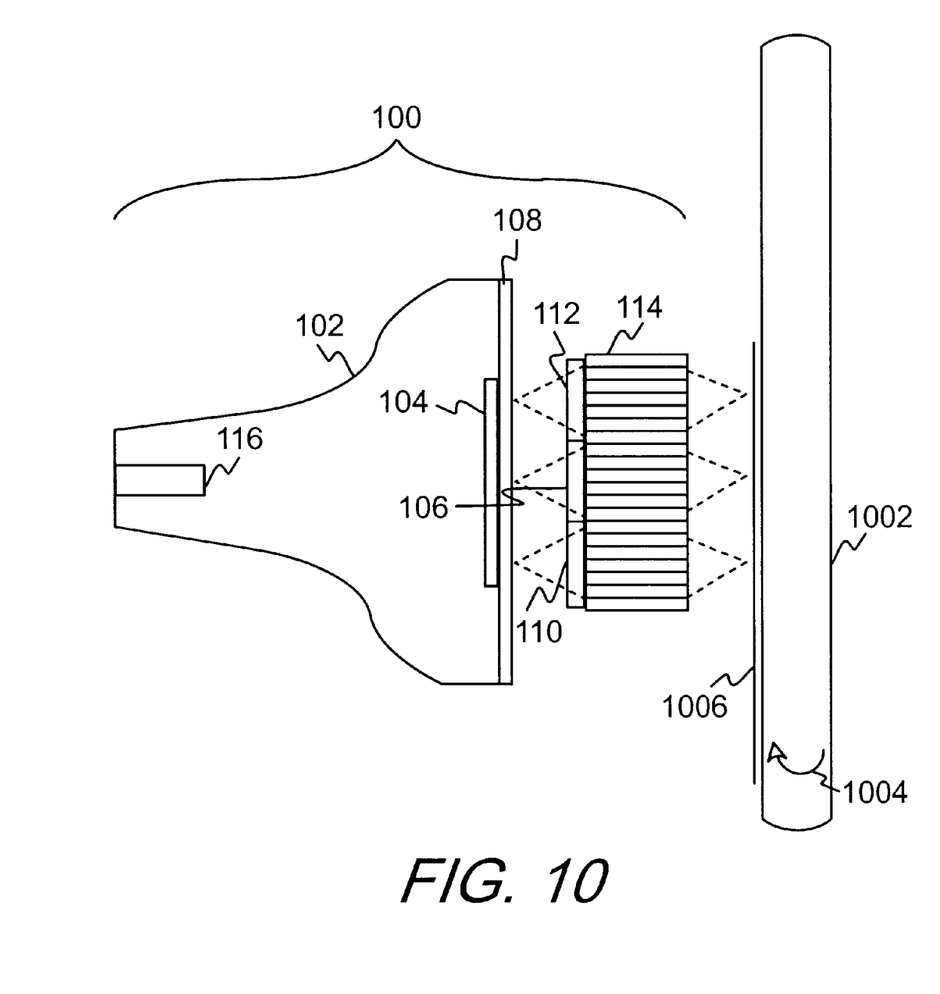
FIG. 10 shows an alternative embodiment of the present invention using a conveyer belt to hold the media.

FIG. 10 shows an alternative embodiment using a conveyor belt to move a sheet of print media through an exposure area. Referring to FIG. 10, as a cut-sheet 1006 of print media is fed onto belt 1002, a vacuum is formed that pulls the sheet to the belt 902 and holds it in place. The sheet is then moved into the exposure area as the belt rotates in the direction of arrow 1004 exposing the leading edge of the sheet. As the sheet moves through the exposure area, the trailing edge of the sheet is also exposed.

Alternatively, pinch rollers could be used to hold the sheet of print media 1006 to the conveyor belt 1002.

Figure 11:
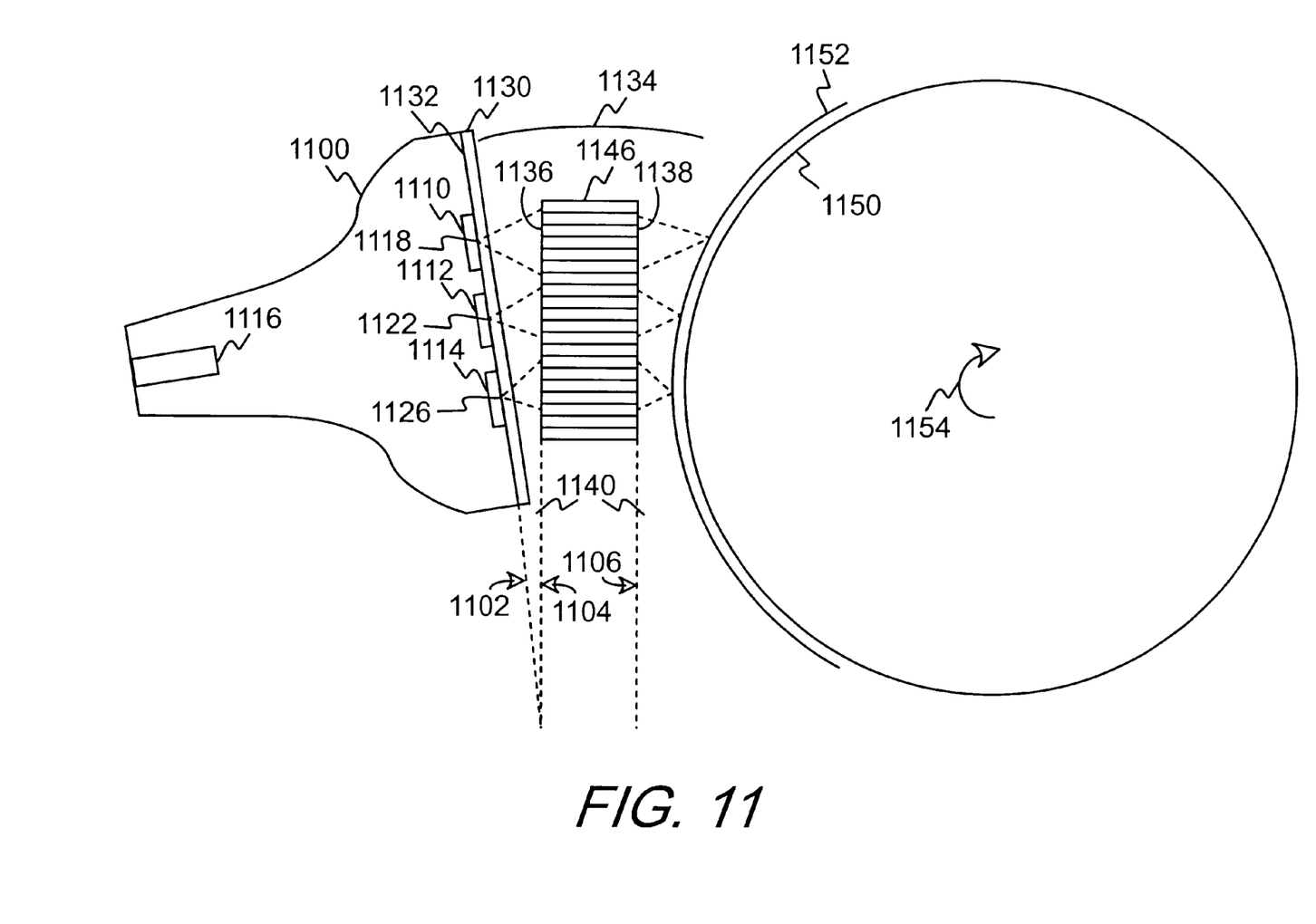
FIG. 11 shows a second alternative embodiment of the present invention using a drum to hold the media during exposure.

FIG. 11 shows a second alternative embodiment that uses a drum to hold the print media while it is being exposed. Referring to FIG. 11, as a cut-sheet 1152 is fed onto a drum 1150 it is held in place by a vacuum. The sheet is then moved into the exposure area as the drum rotates in the direction of arrow 1154 exposing the leading and trailing edges of the sheet. A drum has the added advantage of providing the angle used to compensate for chromatic aberration in a graded index lens print engine.

Alternatively, pinch rollers could be used to hold the sheet of print media 1152 to the drum 1150.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A printer for printing a full-bleed digital image onto photographic print media, said printer comprising:
    an interface for receiving said digital image from an image source;
    cut sheet of said photographic print media;
    linear image exposure device connected to said interface for displaying lines of said full-bleed digital image on a surface of said cut sheet of said photographic media;
    media motion device for transporting said cut sheet of said photographic print media past said linear image exposure device during said displaying of said lines wherein an entire area of said surface of said cut sheet of said photographic print media is exposed, said media motion device comprising a leading pair of pinch rollers for accepting said cut sheet of said photographic print media and for pushing a leading edge of said cut sheet of said photographic print media past said linear exposure device; and a trailing pair of pinch rollers for accepting said cut sheet of said photographic print media and for pulling a trailing edge of said cut sheet of said photographic print media past said linear exposure device;

a controller for directing said lines of said full-bleed digital image from said interface to said linear image exposure device to display said lines of said digital image on said surface of said cut sheet of said photographic print media and to activate said media motion device to transport said cut sheet of said photographic print media past said imaging;

wherein said controller further activates said leading pair of pinch rollers and said trailing pair of pinch rollers in a predetermined sequence that allows exposure of both said leading edge of said cut sheet of said photographic print media and said trailing edge of said cut sheet of said photographic print media, wherein said predetermined sequence comprises closing said leading pair of pinch rollers to push said cut sheet of said photographic print media past said linear exposure device to expose said leading edge of said cut sheet of said photographic print media, and to push said cut sheet of said photographic print media between said trailing pair of pinch rollers, closing said trailing pair of pinch rollers, and opening said leading pair of pinch rollers, wherein said trailing pair of pinch rollers pulls said cut sheet of said photographic print media completely through said linear exposure device to expose said trailing edge of said cut sheet of photographic print media.

2. The printer of claim 1 wherein said linear exposure device comprises a cathode ray tube.

3. The printer of claim 1 wherein said linear exposure device comprises a liquid crystal device.

4. The printer of claim 1 wherein said linear exposure device comprises a light emitting diode device.

5. The printer of claim 1 wherein said linear exposure device comprises a DMD.

6. The printer of claim 1 wherein said predetermined sequence causes said leading pair of pinch rollers to open during an exposure of a plurality of lines of image data and causes said trailing pair of pinch rollers to close during an exposure of a plurality of lines of image data.

7. The printer of claim 1 wherein said linear exposure device comprises a PLZT.

8. The printer of claim 1 wherein said linear exposure device comprises a laser device.

9. The printer of claim 1 wherein said media motion device comprises a drum.

10. The printer of claim 9 wherein said linear exposure device comprises a cathode ray tube.

11. The printer of claim 9 wherein said linear exposure device comprises a PLZT.

12. The printer of claim 9 wherein said linear exposure device comprises a DMD.

13. The printer of claim 1 wherein said media motion device comprises a conveyor belt device.

14. The printer of claim 13 wherein said linear exposure device comprises a cathode ray tube.

15. The printer of claim 13 wherein said linear exposure device comprises a PLZT.

16. The printer of claim 13 wherein said linear exposure device comprises a DMD.

17. A printing method for exposing a full-bleed digital image onto a cut-sheet of photographic print media, said method comprising the steps of:

(a) receiving said digital image from an image source;

(b) displaying lines of said digital image on an exposure area of a linear image exposure device;

(c) pushing said cut sheet of photographic print media past said exposure area of said linear image exposure device during exposure of a leading edge portion of said cut sheet of photographic print media;

(d) pulling said cut sheet of photographic print media past said exposure area of said linear image exposure device during exposure of a trailing edge portion of said cut sheet of photographic print media; and (e) directing said lines of said digital image to said exposure area of said linear image exposure device, and pushing and pulling said cut sheet of said photographic print media in a predetermined sequence that allows exposure of both said leading edge portion and said trailing edge portion of said cut sheet of photographic print media, wherein said predetermined sequence comprises the steps of (e1) pushing said print media into said exposure area to expose said leading edge portion of said cut sheet of photographic print media, (e2) advancing said print media to a predetermined location, (e3) starting said pulling, (e4) discontinuing said pushing, and (e5) advancing said cut sheet of photographic print media to expose said trailing edge portion of said cut sheet of photographic print media.

18. The print method of claim 17 wherein step (e3) is performed during an exposure of a plurality of lines of image data.

19. The print method of claim 17 wherein step (e4) is performed during an exposure of a plurality of lines of image data.

* * * * *